Feb. 4, 1930.  A. C. ATKINS  1,745,521
FASTENING DEVICE
Filed Aug. 22, 1927
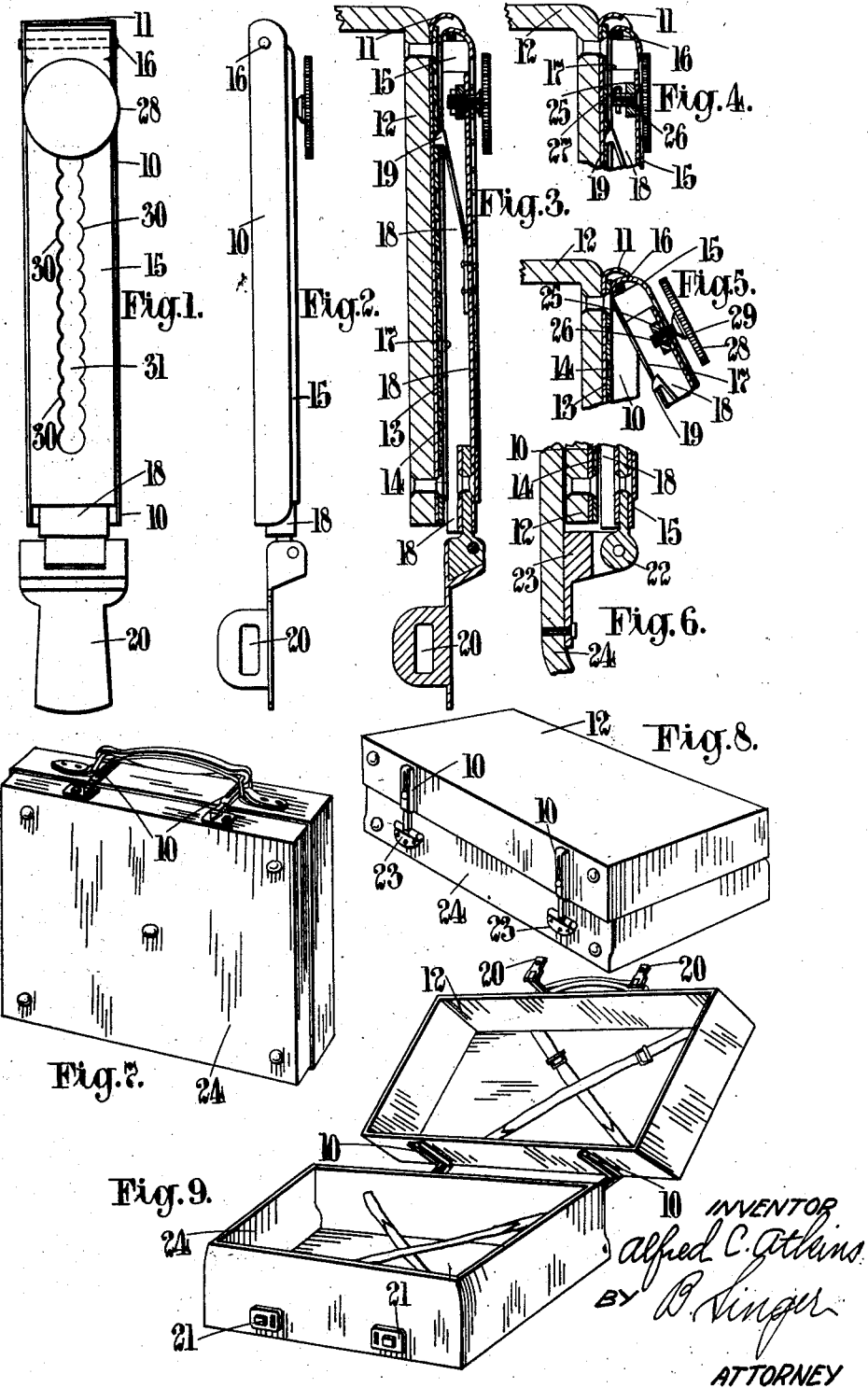

Patented Feb. 4, 1930

1,745,521

UNITED STATES PATENT OFFICE

ALFRED CHARLES ATKINS, OF LONDON, ENGLAND

FASTENING DEVICE

Application filed August 22, 1927, Serial No. 214,729, and in Great Britain August 25, 1926.

This invention relates to fastening devices of the type comprising telescoping or extensible parts for enabling one of the portions of an article to which the devices are attached, for instance the cover of a box or the like, to be adjusted and retained in various positions relative to another portion of the article say the bottom of the box or the like, in order to vary the capacity of the box or the like to suit requirements.

According to the general principle of one portion of the invention, one of the elements of the device is provided with a series of perforated holes, slots or their equivalent and is furnished with suitable means for attaching it to one of the parts of the box or the like. Hinged at one end to the first mentioned element is a second element, which carries slidably a third element provided with a pawl, a pin, tooth or its equivalent, which is adapted when the second element is lowered upon the first element to engage one or more of the perforations or holes, but which when the second element is raised allows the tooth or pawl or its equivalent to be disengaged from the said hole or holes, so as to enable the third element to slide with respect to the second element. The second portion of the box or the like is connected to the outer end of the third mentioned element, say by means of a hinge-plate, or in some cases a spring or other hasp may be attached to the outer end of the third mentioned element, where the combined device is intended to function as the hasp of a lock. Means may be added for limiting the movement of the second element with respect to the first element to the angular displacement strictly necessary to allow the pawl, pin or the like to be lifted from the perforations, slots or the like in the first element.

In addition the invention has for its object to provide means for locking the telescoping members from movement in any desired position, for example to enable the capacity of a box or the like to be set to and retained at any desired limit.

In general, fastening devices constructed according to this additional portion of the invention comprise means operable from the exterior to prevent the telescoping members from having relative movement when desired. In this manner once the capacity of a box or the like has been set to the required size it may be retained at this size by fixing the telescopic hinges, hinged hasps or the like.

The relative movement of the telescopic portions may be prevented by any suitable means for example by interposing an abutment against the retaining pawl or catch usually provided in such fittings co-operating with a suitably disposed rack, to prevent the retaining pawl or catch from coming out of engagement with the said rack or the like. In other constructions the two telescopic members may definitely be fixed together by means of a projection or the like on one part being set to engage with a depression or the like on the other part, either by hand or semi-automatically; with other constructions the telescopic members may be prevented from relative movement by frictional clamping means.

In order that the invention may be better understood it will now be described with reference to the accompanying drawings in which:—

Fig. 1 is a front elevation of one form of fastener constructed according to the invention.

Fig. 2 is a side elevation of the same.

Fig. 3 is a sectional elevation of the same with the fitting attached to the side of one portion of an expansible suit case or the like.

Fig. 4 is a fragmentary view similar to Fig. 3 but with certain parts in another position.

Fig. 5 is a similar view to Fig. 4 with the parts in a still further position.

Fig. 6 is a sectional fragmentary view illustrating the difference in construction when the parts are applied to a hinge in place of a hinged hasp.

Figs. 7, 8 and 9 are perspective views of fasteners and the like constructed according to the invention as applied to one form of expansible suit case or the like, showing respectively an elevation of the suit case in the carrying position, an elevation taken from the rear with the case resting on its base and in the closed position and a similar view to the last but with the case in the open position.

In the extensible fastening device shown in the drawings, a channel member 10 is provided partly closed at one end 11 and open at the other end. This member 10 which in use is attached by riveting or otherwise to one half 12 of the box or the like is provided with a row of perforations or sets of perforations at the base. In the drawing a plate 13 is attached to the base of a channel member 10 and is formed with a number of rectangular perforations 14 at desired distances apart.

A second channel member 15 is provided of such size that its side walls or edges are adapted to fit into and come on the inside of the walls of the first mentioned channel member 10. This second channel member 15 is open at one end and is connected by a hinge 16 to the first mentioned channel member 13, adjacent to the partly closed end 11.

Slidable on the interior of the second mentioned channel member 15 and suitably retained therein by turned round edges 17 of the walls of the member 15, is another channel member 18. This has suitably attached thereto in a desired position a spring pawl 19. The nose of the pawl is so formed and the pawl is so mounted that when the channel member 18 is moved into the first channel member 10 the pawl engages with the material of the plate 13 coming between the perforations 14. The nose of the pawl itself comes in the perforations as will be seen from Figs. 3 and 4. When the channel member 18 is turned about the hinge 16 the nose of the pawl 19 is brought into such a position that it is free of the perforations as shown in Fig. 5.

The construction of the parts is also preferably such that the channel member 18 can only be turned about the hinge 16 through a limited angle, that is through the angle sufficient to raise the pawl 19 out of engagement with the perforations. For this purpose special stop means may be provided or as shown on the drawings, Fig. 5, the partly closed end 11 of the member 10 may act as a stop.

To the outer end of the sliding member 18 may be attached any suitable portion of a fastening device, hinge or the like according to the particular construction and use for which the extensible fastening is intended.

As shown in Figs. 1, 2 and 3 to this outer end of the sliding member 18 a spring hasp 20 is hingedly attached. This hasp is adapted to co-operate with a suitable catch or locking device such for example as those shown at 21 in Fig. 9.

In other cases, for example as shown in Figs. 6 and 8, the outer end of the sliding member 18 is hingedly attached at 22 to a member 23 of a hinge. This part 23 is attached by suitable rivets, screws or otherwise to the portion 24 of the box or the like which co-operates with the upper portion 12.

With fastening devices or the like constructed as hereinbefore described, where it is necessary to telescope or lengthen the said device, it is simply requisite to raise the channel member 15 to a sufficient extent to bring the pawl 19 out of engagement with the rack-like plate 13, whereupon the channel member 18 can be drawn out of the member 15 to any required extent. On the other hand the length of the telescoping portion may be reduced to suit requirements by simply pushing in the channel member 18 (after it has once been drawn out) the pawl 19 slipping teeth owing to its bevelled shape and engaging or locking with any desired hole or perforation 14 when the fastener has been reduced to the required length.

In use in connection with an expanding suit case or the like comprising an upper and lower portion in telescopic engagement for example as shown in Figs. 7, 8 and 9 of the drawings, the lower or body portion 24 of the case at the rear has hinge members such as 23 attached thereto in suitable positions and the upper portion 12 has attached thereto the channel plates 10. At the front the lower portion 24 has the locks 21 suitably positioned thereon, the members 10 being attached to the portion 12 at the front for the hasps 20 to be brought into engagement with the locks 21.

It will be appreciated that the case can be placed in the open position as shown in Fig. 9 and the extensible fittings brought to their greatest length in a manner previously explained and then by closing the portion 12 over the portion 24 and engaging the hasps 20 with the locks 21 the portion 12 may be telescoped over the portion 24 a desired extent, the pawls 19 slipping and allowing this action. It is however not possible in the closed position of the case for the portion 12 to be drawn off the portion 24 as the pawls prevent this reverse movement, until they are freed as hereinbefore explained.

In some cases the telescopic channel member such as 18 may be strengthened towards its lower end by inserting thereinto and attaching thereto another channel member the walls of which come inside the walls of the channel 18 and the base of which comes remote from the base of the channel 18. The structure is thus somewhat rectangular in cross section and the strengthening channel member extends from the free end up to the pawl and it thus forms a protection for the spring thereof.

In some cases with telescopic fittings constructed as previously set forth or with telescopic fittings of the type to which the invention generally relates, means may be provided for locking the telescoping members from movement in any desired position, for example to enable the capacity of a box or the like to be set to and retained at any desired limit.

One method of carrying this into effect is shown combined with the structural form of the device as previously described, and for this purpose the telescopic member 18 has attached on the interior to the base thereof in any suitable manner for example by brazing, soldering or the like a nut 25. This nut is fixed in position and has screwing therethrough a screwed stem 26 furnished with a stop 27 to prevent the screw from being screwed right out of the nut. The stem is formed with a circular flat disc-like head 28 the edge of which is milled and beneath the head a small somewhat conical portion 29 is located. The base of the hinged channel member 15 is formed with a series of notches 30, see Fig. 1, which open one into the other leaving a slot 31.

The narrow portions of the slot 31 are sufficiently wide to enable the screwed stem 26 to pass freely through the slot. When however the head is screwed inwards the conical enlargement 29 enters between two notches 30 on each side of the slot, the notches being arranged opposite for this purpose. By this means the conical enlargement locks the sliding channel member 18 in position as desired to the channel member 15 and prevents the telescoping parts from being lengthened or shortened.

In place of a bevelled enlargement such as 29 under the head 28, in some cases the enlargement may simply form a step which is not bevelled and the co-operating notches such as 30 be disposed in a set definite position relative to the opening or perforations 14 in the plate 13. In this way in whatever position the telescopic member 18 is held by its pawl, the arrangement is such that the stepped enlargement beneath the head 28 comes in alignment with a pair of notches 30 and by screwing in the head, the enlargement engages with these notches and holds the parts from movement.

Any other means may be provided, automatic or otherwise in their action for locking the telescoping members together to maintain them set at required lengths.

In one constructional form an eccentrically mounted cam member is provided on one of the telescopic members of a fitting operable from the exterior which when the case has been brought to required size, may be manipulated by a suitably disposed handle or otherwise to lock the telescopic parts together, by the cam member frictionally engaging against the other member of the telescopic fitting.

According to another constructional form a spring pin may be carried by one telescopic member and normally be held out of engagement with the other telescopic member and when the parts are adjusted to the required position may be operated to allow the spring pin to engage with one of a number of apertures or the like carried by the other telescopic member. With such a construction the pin may be mounted upon a flat strip spring adapted to be turned upon a pivot or the like to be brought into or out of the engaging position.

With telescopic fittings of the type to which the invention relates the construction usually includes a pawl or catch on one telescopic member which engages with a rack carried by the other telescopic member, or otherwise suitably positioned. This pawl or catch and rack mechanism are usually so disposed that it is possible when a collapsible suit case or the like has been closed and fastened, still to telescopically shorten the fittings.

This action frequently results in fragile and delicate articles carried in the suit case or the like being crushed and the invention has for one of its objects to prevent this crushing action.

The various constructional forms already described herein would produce the desired result but in other constructions the same result may be obtained by preventing the pawl or retaining catch from slipping the teeth of the co-operating rack or the like to shorten the telescopic fittings when the case or the like is closed. This may be accomplished by interposing any suitable abutment in desired position or positions to prevent the retaining pawl or catch coming out of engagement with the rack. Such an abutment could be brought into position by means operated from the exterior, when required.

With expansible suit cases and the like it is usual to provide four telescopic fittings such as herein described and the invention could be applied to all of these or to some according to requirements.

When using an expansible suit case or the like with fittings made according to the invention, assuming the case to be open, it is packed as required and then the cover closed down over the box portion and the hasp fittings fixed to the cooperating locks, the telescopic parts having been set to the required position prior to this locking or subsequently. To retain the telescopic fittings in this set position the exterior locking means for preventing the movement thereof are now manipulated. These means can be constructed according to any of the particular forms or combinations of forms herein described, or can be of any other construction to effect the same object.

Upon opening the box the locking device for holding the telescopic parts relatively fixed may be operated if the particular construction of the fitting requires this to be done before the case can be unlocked or opened, or the telescopic parts may remain locked together if the construction permits so that they can retain the desired set position when the case is refastened.

The invention is not limited to the precise forms or details of construction described as these may be varied to suit particular cases.

What I claim and desire to secure by Letters Patent of the United States of America is:—

1. An extensible fastening means for connecting together two parts of a box-like article of the class described, comprising an element adapted to be attached to one part of the article and provided with a rack, a second element hinged to the first mentioned element, a third element slidably carried by the second element and provided with a pawl which is adapted when the second element is lowered upon the first element to engage the rack thereof, but which, when the second element is raised, allows the pawl to be disengaged from the said rack so as to enable the third element to slide with respect to the second element, and means connected to the outer end of the third mentioned element for attachment to the other part of the box-like article.

2. An extensible connecting means according to claim 1, wherein the first mentioned element is provided with a series of perforations constituting a rack.

3. Fastening devices as claimed in claim 1, including a plate attached to the first element and having a number of perforations to constitute the rack for engagement by the pawl carried by the third element, and in which the pawl is a spring strip having attached thereto at its free end a nose for engaging the rack.

4. Fastening devices as claimed in claim 1, including means for limiting the angular movement of the second element about its pivot with the first element.

5. Fastening devices as claimed in claim 1, in which the free end of the sliding third element has hingedly attached thereto a hasp, for engagement with a co-operating fastening device on the other portion of the box.

6. Fastening devices as claimed in claim 1, in which the free end of the sliding third element has pivotally attached thereto one portion of a hinge adapted to be secured to the other portion of the box.

7. Fastening devices of the type set forth or as claimed in claim 1, in which the box-like article connecting means include means for locking the telescoping members from movement in any desired position.

8. Fastening devices of the type set forth in claim 1, including means for securing the telescoping members from movement in any desired position, said means for securing the telescoping members being active to prevent disengagement of the pawl from the rack.

9. Fastening devices of the type set forth in claim 1, including means for securing the telescoping members from movement in any desired position, said means for securing the telescoping members including means to clamp the telescoping members together.

10. Fastening devices of the type set forth in claim 1, including means for securing the telescoping members from movement in any desired position, said means for securing the telescoping members comprising a projection on one of said members, the other said member having a recess for engagement by said projection.

11. Fastening devices of the type set forth in claim 1, including means for securing the telescoping members from movement in any desired position, said means for securing the telescoping members including a manually operable screw having a nut slidably engaged with one of the telescoping members, the other said member having notches for engagement by said screw.

In witness whereof I affix my signature.

ALFRED CHARLES ATKINS.